(No Model.)

E. A. ROWLEY.
CRANK SHAFT OR JOURNAL BEARING.

No. 263,812. Patented Sept. 5, 1882.

WITNESSES:
N. H. Culver
Geo. T. Kelly

INVENTOR
Edwin A. Rowley,
by Collier & Bell,
Attys.

UNITED STATES PATENT OFFICE.

EDWIN A. ROWLEY, OF WILLIAMSPORT, PENNSYLVANIA, ASSIGNOR TO ROWLEY & HERMANCE, OF SAME PLACE.

CRANK-SHAFT OR JOURNAL BEARING.

SPECIFICATION forming part of Letters Patent No. 263,812, dated September 5, 1882.

Application filed June 5, 1882. (No model.)

*To all whom it may concern:*

Be it known that I, EDWIN A. ROWLEY, of Williamsport, in the county of Lycoming and State of Pennsylvania, have invented a certain new and useful Improvement in Crank-Shaft or Journal Bearings, of which improvement the following is a specification.

The invention is specially adapted for use in mortising-machines, and is here shown and described in connection therewith, though equally applicable to other classes of machines in which shafts and journals are exposed to an upward thrust.

The object of my invention when so applied is to afford increased strength and stability in the supporting member of a mortising-machine, and thereby to obviate wear and lost motion and enable the machine to be operated at a higher rate of speed than heretofore.

Figure 1:
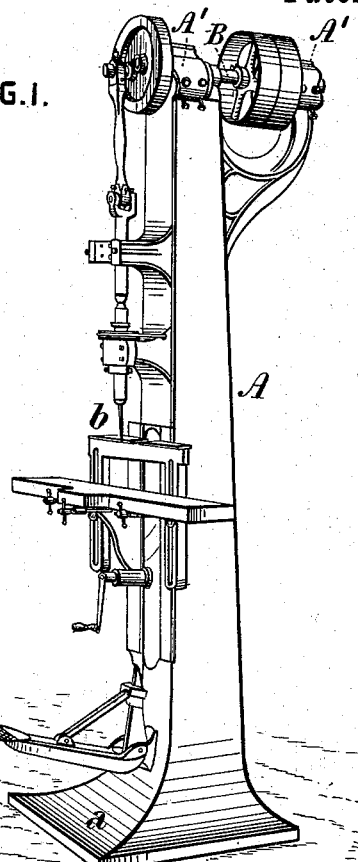
Figure 3:
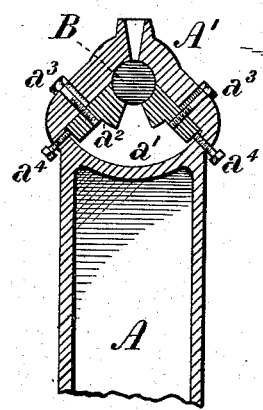
Figure 2:
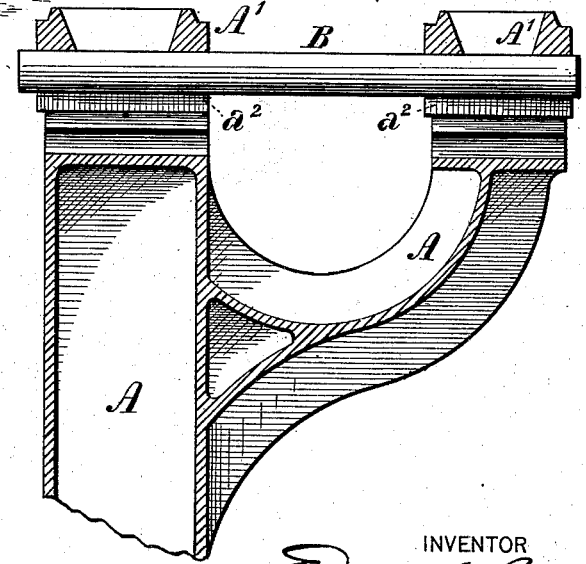

In the accompanying drawings, Figure 1 is a view in perspective of a mortising-machine embodying my invention; and Figs. 2 and 3, longitudinal and transverse sections, respectively, upon an enlarged scale, through the crank-shaft bearings.

The frame A of the machine is a vertical column or post having an enlarged foot or base, $a$, and supporting at its top the crank-shaft B, by which the chisel $b$ is reciprocated.

As ordinarily constructed the crank-shafts of mortising-machines have been located above their bearings, and in such case the strain due to the action of the chisel upon the lumber is exerted upon and sustained by the caps and bolts of the bearings.

In the practice of my invention the bearings $A'$ of the crank-shaft are formed in a single piece with the main body of the frame, and are extended above and around the crank-shaft, which passes through openings $a'$ in the frame beneath the bearings, the bearings sustaining and communicating directly to the body of the frame the upward strain induced by the operation of the chisel. The caps of the bearings are bolted thereto in the recesses, and consequently below the crank-shaft, and in this instance caps composed of two independently-adjustable sections, $a^2$, secured to the bearings by bolts $a^3$, and provided with adjusting-screws $a^4$, are employed. The ordinary single-piece caps are, however, equally adaptable, and may, if preferred, be used in lieu of sectional caps.

It will be apparent that by my improvement the frame is caused to sustain the entire strain in the work of the machine, and the caps and cap-bolts being relieved from any duty further than that of supporting the weight of the crank-shaft and its connections, the wear of the parts is correspondingly reduced and such firmness and solidity attained in the structure as to materially improve and facilitate the operation of the machine.

I claim as my invention and desire to secure by Letters Patent—

A shaft or journal bearing having a part formed in one piece homogeneous with the frame of the machine, and extending above and around the shaft or journal, combined with adjustable lower sections, substantially as set forth.

EDWIN A. ROWLEY.

Witnesses:
THOS. H. HARTMAN,
J. S. TAYLOR.